US006959296B1

(12) United States Patent
Reiss

(10) Patent No.: US 6,959,296 B1
(45) Date of Patent: Oct. 25, 2005

(54) SYSTEMS AND METHODS OF CHOOSING MULTI-COMPONENT PACKAGES USING AN EXPERT SYSTEM

(76) Inventor: Paul Reiss, 315 Teetertown Rd., Califon, NJ (US) 07830

(*) Notice: Subject to any disclaimer, the term of this patent is extended or adjusted under 35 U.S.C. 154(b) by 239 days.

(21) Appl. No.: 09/950,533

(22) Filed: Sep. 13, 2001

Related U.S. Application Data

(60) Provisional application No. 60/233,922, filed on Sep. 20, 2000.

(51) Int. Cl.[7] ............................................. G06F 17/30
(52) U.S. Cl. ........................................... 707/3; 707/10
(58) Field of Search ...................... 707/2, 3, 10, 104.1; 705/5; 709/217; 715/501.1

(56) References Cited

U.S. PATENT DOCUMENTS

| | | | |
|---|---|---|---|
| 5,897,620 A | 4/1999 | Walker et al. | |
| 5,909,492 A | 6/1999 | Payne et al. | |
| 5,948,040 A * | 9/1999 | DeLorme et al. | 701/201 |
| 6,004,211 A | 12/1999 | Brenner et al. | |
| 6,236,978 B1 | 5/2001 | Tuzhilin | |
| 6,307,573 B1 * | 10/2001 | Barros | 345/764 |
| 2002/0072937 A1 * | 6/2002 | Domenick et al. | 705/5 |
| 2002/0133488 A1 * | 9/2002 | Bellis et al. | 707/6 |

OTHER PUBLICATIONS

Hayes "Expert system for development of request for proposal packages and evaluation of proposals", IEEE 1989, pp. 1364-1369.*
Lohse et al "Electronic shopping", Communications of the ACM, Jul. 1998, vol. 41, No. 7, pp. 81-88.*

* cited by examiner

Primary Examiner—Uyen Le
(74) Attorney, Agent, or Firm—Gibbons, Del Deo, Dolan, Griffinger & Vecchione

(57) ABSTRACT

A system and method for querying, selection and ordering complex multi-component item packages using a personal computer communicating over a global communications network. The system prompts the user with interactive staged queries on the intended equipment use, location, type and relative equipment quality requirements, for instance. The system determines the required item components of a package that correspond to the user requirements by referencing an expert system database which contains a listing of items. The user may then choose the entire selected package of items or delete any items not needed and then place the order. The selection website has interchangeable framing for access from another website in a manner transparent to the user.

14 Claims, 11 Drawing Sheets

Now tell me your fishing preferences. If you use exclusively one type of gear (bait casting only, for example) please select it from the list. If you use more than one, select one type first, then come back again after finishing the first package and select a second. You can simply edit the two packages in your cart to customize a final outfit to your preferences. If you'd like me to suggest a variety of gear for your use, choose "Optimal Mix".

Step 4:
Choose the type of tackle you prefer: Baitcasting - Left Hand

And then click the NEXT button.

BACK  NEXT

RESTART

Peacock Bass - Amazon Trophy    Brazil    Caures River

Tackle Type Description:
Baitcasting gear typically allows an angler to cast with great accuracy and a low trajectory. It can be very advantageous in tight

FIG. 8

I've assembled several outfits for you. They vary in scope and price. Although you tend to get what you pay for, it isn't always necessary to buy the absolute best. Sometimes, 'pretty-good' will suffice. With that in mind, please review the outfits with an eye toward your own budget. Select the outfit that you are comfortable with. By the same token, many anglers love new trips just because they provide a good excuse to buy new toys!

Outfit Selection:

Select an outfit level: Gold ▼

And then click the NEXT button.
You can always edit, add, delete, or start again.

Take a quick look at all three levels and decide what looks best for you.

Silver <$428.97>
Gold <$846.96>
Platinum <$1,183.58>

BACK  NEXT

RESTART

Peacock Bass - Amazon Trophy    Brazil    Caures River    Baitcasting - Left Hand

Outfit Level Description:

```
The gold level
outfit is
designed to
provide a
reasonably priced
```

FIG. 9

Caures River - Lure Pkg - Tr. PB - *BCW Casting/Gold

To totally delete an item – uncheck the first box. To add or change the quantity of an item, simply replace the number in the second box. The item cost and total will be adjusted and the edited package will then be retained for you.

Description:
This package is designed to provide lures for about one week of fishing.

FREE! - Plano 3730 Tackle Box - with Each Unmodified Lure Package Purchased
Our "thank you" for helping us make order fulfillment easier.

| # | Item | Cost |
|---|------|------|
| ☑ 1 | Hooks - Upgrade - VMC Cone Cut 3X Replacement Hooks (1/0) | $3.75 |
| ☑ 1 | Hooks - Upgrade - VMC Cone Cut 3X Replacement Hooks (2/0) | $4.25 |
| ☑ 4 | Jigs - Hand-Tied - Garrett's Red Baron - .5/gld-ylw-red/b | $26.00 |
| ☑ 1 | Lures - Bill Lewis - Rat-L-Trap - .75/chart-shiner/bn | $3.39 |
| ☑ 1 | Lures - Bill Lewis - Rat-L-Trap Magnum Force - 1.0/fire tiger/b | $4.99 |
| ☑ 1 | Lures - Bomber - Heavy Duty Long "A" - .875/fire river/bn | $4.35 |
| ☑ 1 | Lures - Bomber - Heavy Duty Long "A" - .875/span-mack/n | $4.35 |
| ☑ 1 | Lures - Cotton Cordell - Red Fin - 1.0/chrome-blue/n | $5.25 |
| ☑ 1 | Lures - Cotton Cordell - Red Fin - 1.0/gold-blk/n | $5.25 |
| ☑ 1 | Lures - Excalibur - Super Spook - .875/bleeding shad/n | $6.49 |

FIG. 11

SYSTEMS AND METHODS OF CHOOSING MULTI-COMPONENT PACKAGES USING AN EXPERT SYSTEM

CROSS REFERENCE TO RELATED APPLICATION

This application claims priority of Provisional Application No. 60/233,922 which was filed on Sep. 20, 2000.

BACKGROUND OF THE INVENTION

This invention relates to electronic data processing and more specifically to systems and methods of use for querying, selecting and ordering complex multi-component packages.

Purchasers of specialized, complex, multi-component packages, such as fishing tackle packages, have traditionally had to perform independent research on the requirements of a particular location, species and fishing method. They then had to coordinate the individual item selection to obtain a workable ensemble and then order the components of the package, which might have hundreds of components, through many vendors. Research could be required which may include review of guidebooks and equipment catalogs and consultations with salesmen or manufacturer's representatives. Often the requirements for a particular fishing location may only be known to a small group of specialists requiring investigation by the user to find those specialists.

Today many people are very busy and have less time than in the past. In order to acquire the required components it is probable that multiple stores, catalog vendors or other sources would have to be contacted and orders placed therewith. Performing the required research and purchase coordination for complex multi-component packages requires significant effort and is time consuming.

Given the complexity and number of specialized items required to form a package, it is possible that the user could be provided with erroneous information leading to the purchase of one or more components that are not suited to the required use. Since the components have to be matched to one another to operate correctly, an incorrect component choice can lead to non-functionality of the system as a whole. Additionally, a user may fail to identify and purchase a required component thus leading to the acquisition of a non-functioning system.

Even with sophisticated search engines it may be difficult for users to find the invention website. The invention's ability to be accessed and used directly through multiple separate websites facilitates the user's access and further ensures that the user can obtain a coordinated, appropriate system.

Thus, purchasers of complex multi-component packages need systems and methods of purchase that do not require extensive investments of time and effort. Additionally, obtaining a coordinated, appropriate multi-component package needs to be more assured of occurring.

Many of the foregoing identified problems are solved by this invention. The systems and methods of use for querying, choosing and ordering complex multi-component packages of the invention provides a convenient, efficient and more reliable alternative to the methods currently available.

Accordingly, it is an object of the present invention to permit the user to be queried on the required use of the items, with subsequent selection of components and ordering using a personal computer communicating over a global communications network.

Further, it is another object of the present invention to present the user with staged queries on the intended use, location, family of items and relative item quality requirements, or other suitable criteria. It is another objective of the present invention that the system determines the required components based on the results of the queries and presents those component choices to the user. It is yet another objective of the present invention that the user can make modifications, additions or deletions, to the component lists, if desired. It is yet another object of the present invention to permit the user to place an order for the components.

It is yet another object of the present invention to have access from other websites on the global communication network by requesting a purchase and having the invention site appear with originating site framing.

SUMMARY OF THE INVENTION

These and other objects of the invention are accomplished with the principle of the present invention being providing systems and methods for choosing multi-component packages.

The present invention uses a personal computer on a global communications network for querying a user, selecting and ordering complex multi-component item packages. A local personal computer is used to access databases via the global communications network. The user is prompted through a series of staged queries, which are stored in a database. The interactive queries progressively question on item use, location, family of item type and quality requirements, for instance. A logic tree is used to select appropriate queries from the selection database as the queries progress.

Based on the results of the querying, the components will be selected from a component database. The selection logic is preprogrammed based on specific expertise and research that is integrated into the logic, thus comprising an expert system. The selected recommended items forming a package are then displayed. The selected items represent all those necessary to comprise a fully functional system. The user can then review the recommended items selection and make changes if, for instance, they already own some of the specific components. Upon finalization of the selections, an order can then be placed electronically.

A user from another website, who may require a complex multi-component package, may access the invention website by requesting purchase (i.e. clicking "PURCHASE EQUIPMENT PACKAGES") from within the original website. The invention website has interchangeable framing that will mimic the originating website. The user will not be aware that he has left the originating website. This feature allows seamless user interaction. A user could book a trip on the global communications network to Brazil on a certain river and wish to buy a multi-component fishing package. The user would then "click" on "PURCHASE EQUIPMENT PACKAGES" and have access to the invention website under the trip vendor's framing. This facilitates purchase of an integrated package for the user.

DESCRIPTION OF THE DRAWINGS

FIG. 8 is a representation of a display image of a specific embodiment of the type of tackle query screen according to the present invention.

FIG. 9 is a representation of a display image of a specific embodiment of the quality of tackle query screen according to the present invention.

FIG. 11 is a representation of a display image of a specific embodiment of a listing of items selected by the invention.

DETAILED DESCRIPTION OF THE PREFERRED EMBODIMENT

Figure 1:
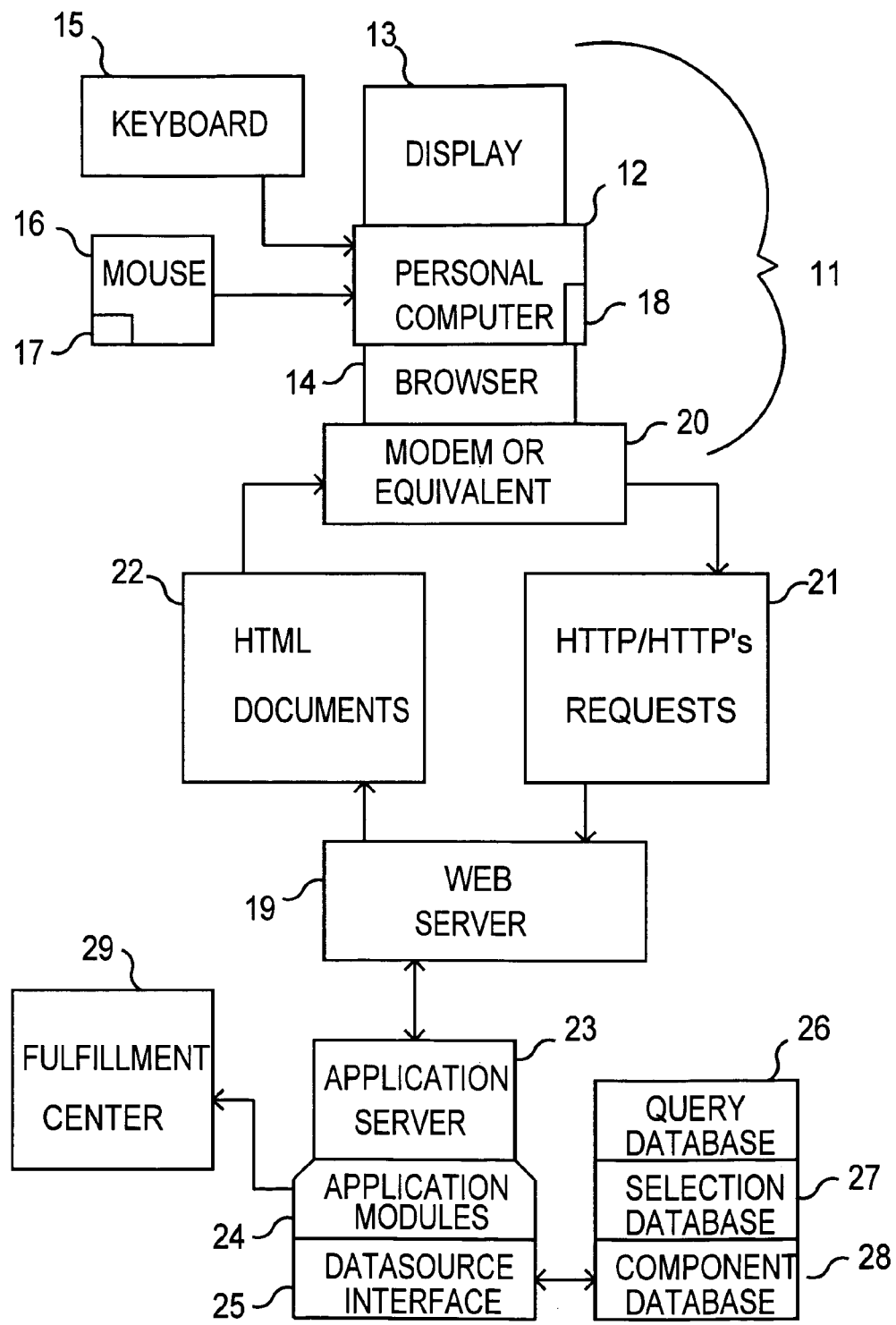
FIG. 1 is a block diagram illustrating a specific embodiment of the hardware and software of a system according to the present invention.

Referring to FIG. 1, there is illustrated a computerized order selection, processing and delivery system 11 according to the present invention. The present invention includes a personal computer system 12 and a display device 13. The personal computer system 12 may be any suitable personal computer using conventional operating systems such as Microsoft Windows™, Apple Macintosh™, UNIX, LINUX or any future operating system. The computer system with associated operating system has to be capable of running a browser 14 such as Microsoft Internet Explorer™, or Netscape Navigator™.

A user may communicate to the computer system through data entry devices such as a keyboard 15 or a pointing device such as a mouse 16. However, other data entry devices may be used, such as speech recognition devices. The term "click" or "clicking" as will be used hereafter, is well known to computer users familiar with mouse devices 16. These terms mean that a particular action is taken by the personal computer system 12 when the user depresses a button 17 on the mouse 16 while a symbol corresponding to the position of the mouse relative to a graphical image on the display 13 is shown.

The browser 14 is an application program running from the hard drive 18 of the personal computer system 12 that provides a method where the user may request information from a web server 19. The user requested information from the browser 14 is communicated by a modem 20 or equivalent which will convert digital signals from the personal computer system 12 to signal suitable for transmission over telephone lines or equivalent communication networks.

The user requested information is transmitted in HTTP/HTTPS's (Hypertext Transfer Protocol/Secure Hypertext Transfer Protocol) requests 21, or other suitable protocol. These protocols allow files to be exchanged in a standardized method on the global communications network. User request responses are by the use of HTML (Hypertext Markup Language) documents 22 to the browser 14. The HTML program instructions to the browser 14 indicate the method information is to be displayed. The web server 19 is a program that communicates the files that form documents to users of the personal computer system 12, by communicating with a remote application server 23 which is an operating system that supports the business logic for the invention. The application modules 24 perform the functionality of the invention within the application server 23. The application modules 24, via the datasource interface 25, communicate data from the query database 26, selection database 27 and component database 28. Upon completion of choosing and ordering an item package, an order is sent to a fulfillment center 29, such as a warehouse with associated shipping department, for package assemblage and mailing.

Figure 2:
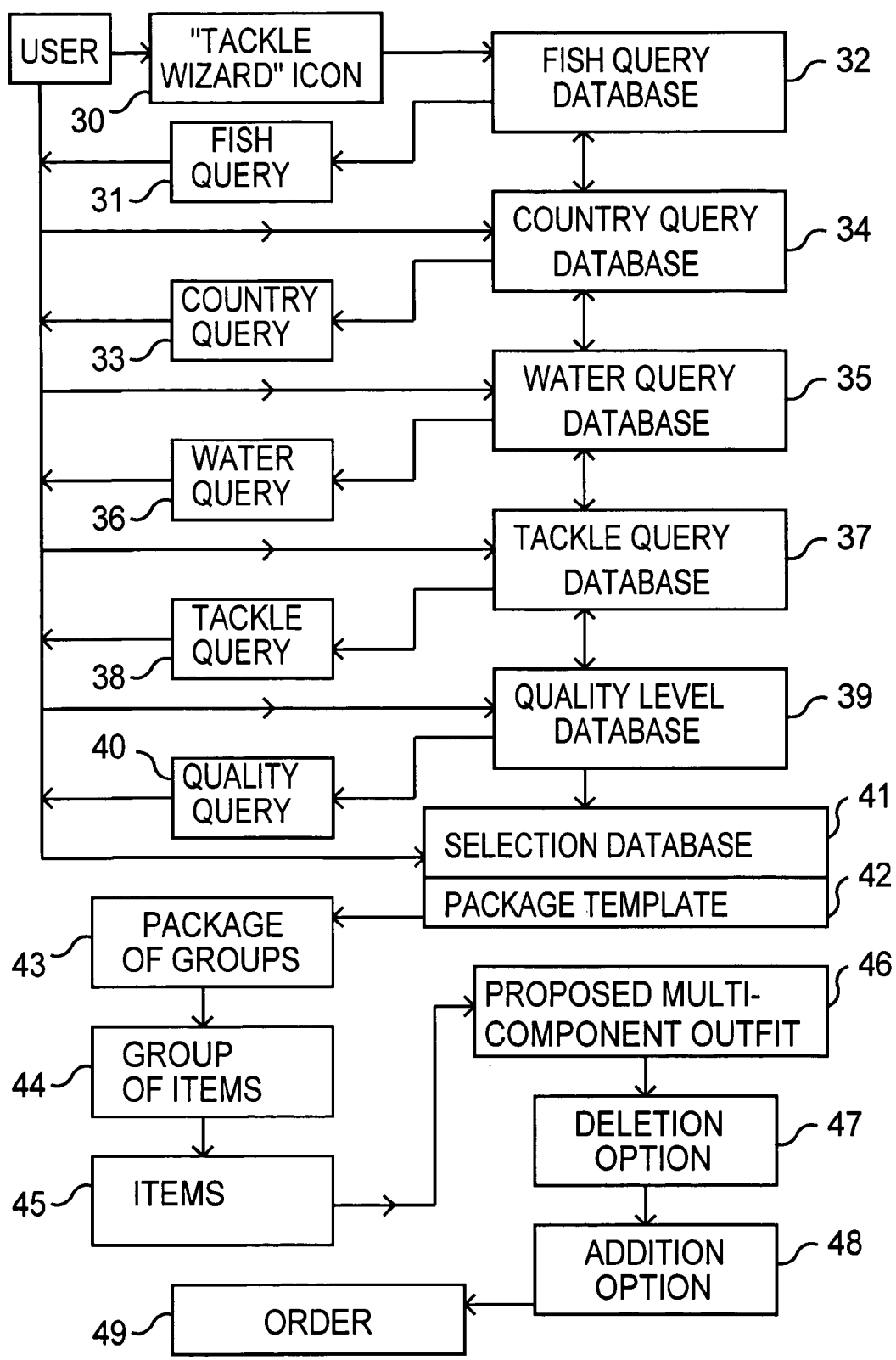
FIG. 2 is a diagram depicting a flow chart illustrating the logical flow of a specific embodiment of the software according to the present invention.
Figure 4:
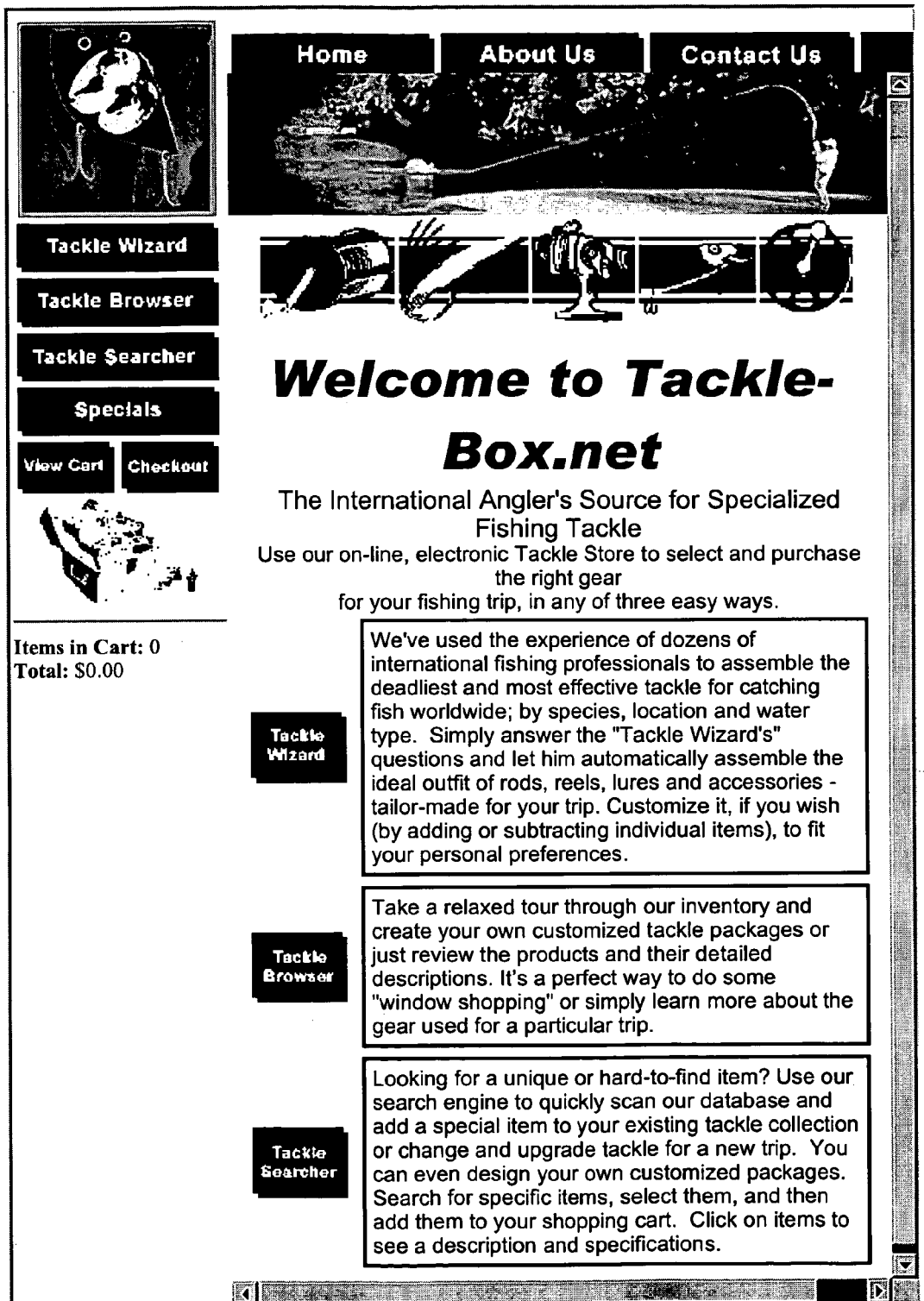
FIG. 4 is a representation of a display image of a specific embodiment of the process initiation screen according to the present invention.

Referring to FIG. 2, there is illustrated as an example, the logical flow steps that would be used to order a complex multi-component equipment package such as a fishing rod, reel, lures, terminal items and accessory package. Referring to FIG. 4 there is illustrated a representation of a display image of the process initiation screen containing the "Tackle Wizard" icon 30 which is used to initiate the query, selection and ordering system of the invention. The user may also access a "Tackle Browser" which can be used to scan the items in the database, grouped by type. The user can also access a "Tackle Searcher" which is used to search the equipment items 45 based on a typed search term input by user. The screen may be varied to mimic an originating website via which a user may have entered this website. The user would typically initiate the process by clicking on a "Tackle Wizard" icon 30.

Figure 5:
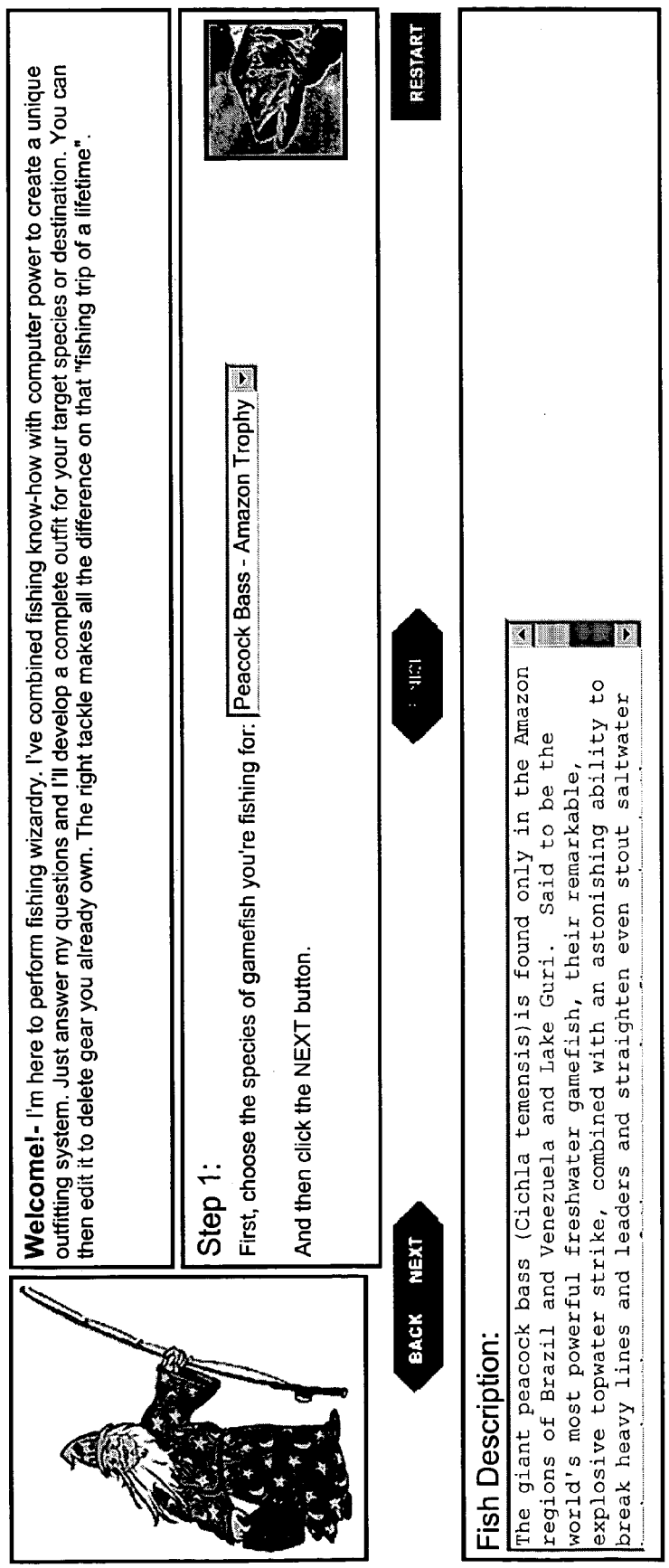
FIG. 5 is a representation of a display image of a specific embodiment of the fish query screen according to the present invention.

Referring to FIG. 2, the expert system would then prompt the user with a fish query 31 generated and based on the fish query database 32 asking what type of fish the package was intended to be used for. Referring to FIG. 5 there is illustrated a representation of a display image of the fish query 31 screen where the user can select the fish species requiring the equipment components. Based on the response, using the country query database 34 and associated programming logic, the application server 23 would then answer with a country query 33 querying the country the package was to be used in.

Figure 6:
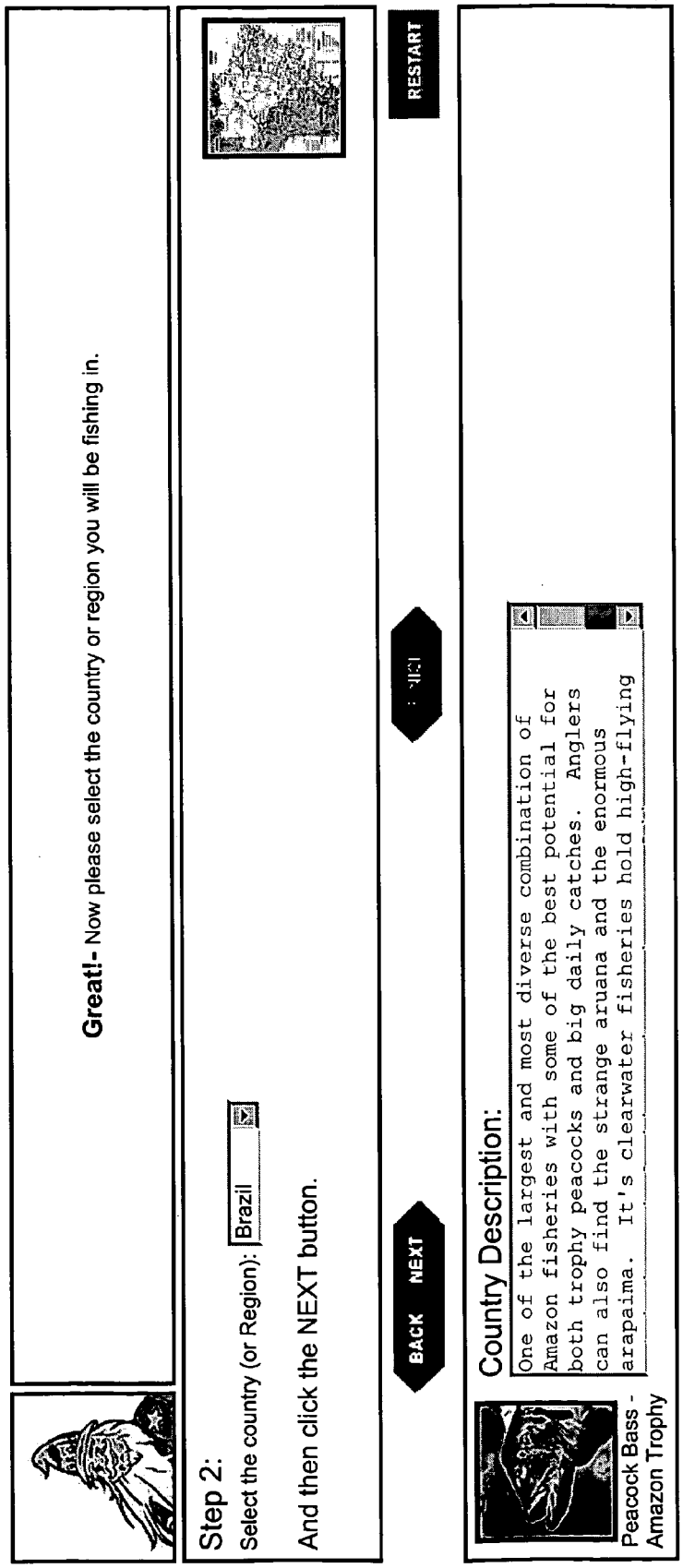
FIG. 6 is a representation of a display image of a specific embodiment of the country query screen according to the present invention.
Figure 7:
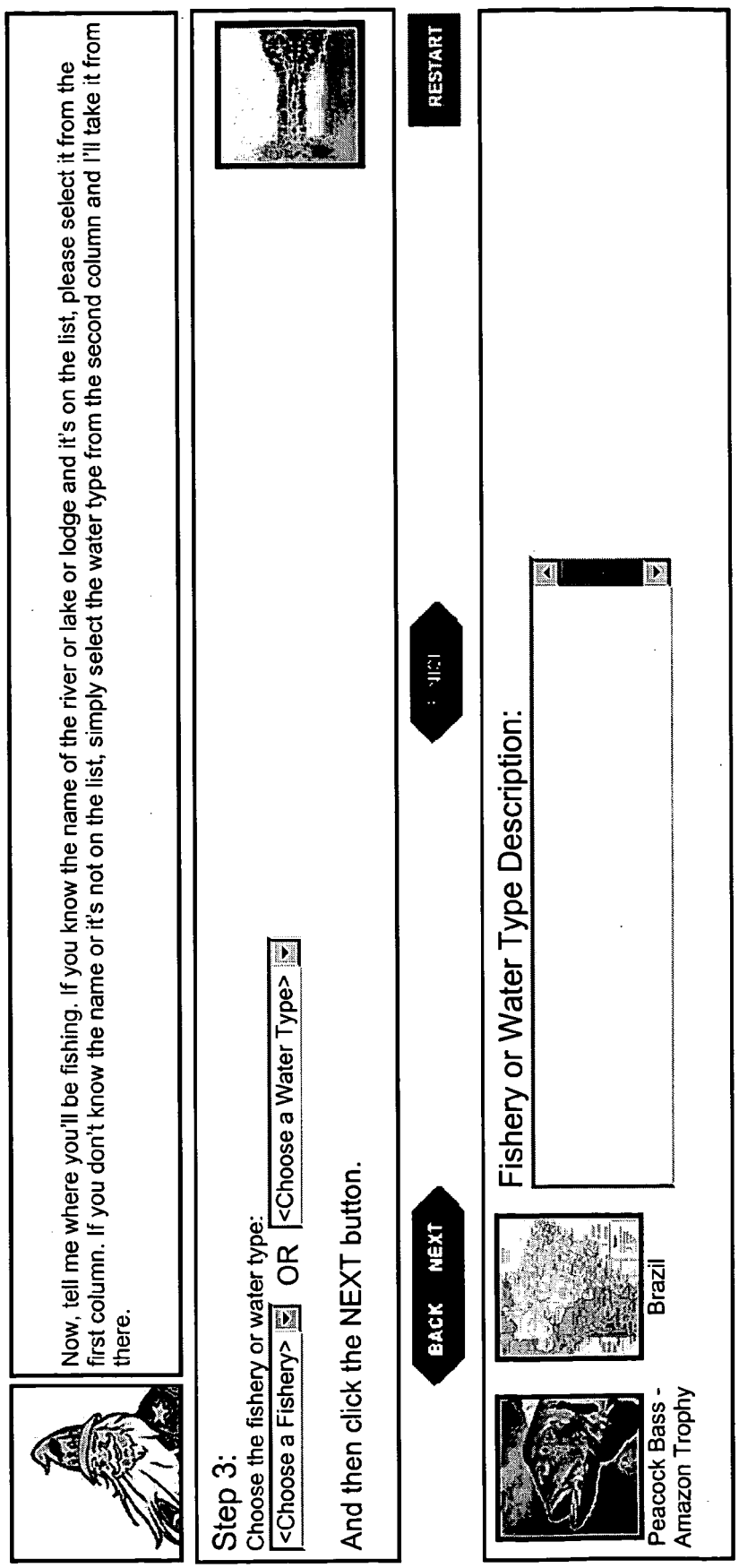
FIG. 7 is a representation of a display image of a specific embodiment of the fishery or water type query screen according to the present invention.

Referring to FIG. 6 there is illustrated a representation of a display image of the country query 33 screen where the user can select the country requiring the equipment components. Based on the fish and country query responses, using the water query database 35 and associated programming logic, the application server would then answer with an iterative water query 36 asking the water type (clear, cloudy, etc.) or the name of the body of water the package is intended to be used in. Referring to FIG. 7 there is illustrated a representation of an image of the water query 36 screen where the user can select the water type or body of water that the required equipment components are to be used in.

Based on the response, returning to FIG. 2, using the tackle query database 37 and associated programming logic, the application server 23 would then query with a tackle query 38 asking the type of tackle (baitcasting, spinning or fly) the customer prefers. Referring to FIG. 8 there is illustrated a representation of a display image of the tackle query 38 screen where user can select the tackle type desired.

Returning to FIG. 2, based on the series of responses, using the quality level database 39 and associated programming logic, the application server 23 would then answer with an iterative quality query 40 asking the product quality level the customer prefers (i.e. economy ("silver"), moderate ("gold"), premium ("platinum")). Referring to FIG. 9 there is illustrated a representation of a display image of the quality level 40 screen where user can select the tackle quality level desired.

Based on the query responses, the application server 23 and associated programming would then access the selection database 41 which contains the package template 42. The package template 42 accesses sequentially within the selection database 41 the data consisting of a package of groups 43 which is the selected items from equipment groups such as lures, rods, etc. The associated programming then sequentially accesses the data consisting of the groups of items 44, such as a subset of lures. The associated programming then sequentially accesses the individual items 45 within the group of items 44. The application server 23 with associated program logic then produces proposed multi-component package items 46 broken down into the categories of rods and reels, lures and terminal items and accessories and other items which would then be displayed to the customer.

Figure 10:
FIG. 10 is a representation of a display image of a specific embodiment of the addition or deletion of components screen according to the present invention.

The user may make additions or deletions of listed equipment items to the proposed package. Referring to FIG. 10 there is illustrated a representation of a video image of the package of groups 43 selection generated by the "Tackle Wizard" which can then have components added or deleted from a multi-component package. For the deletion option 47, the user may click on a "remove" box next to the equipment item. For the addition option 48, the user may click on an additions icon, then the equipment classification icon, then the particular item in order to choose an additional item. This is accomplished by accessing the component database. The user may then accept the package, pay through an on-line credit card or other suitable method and the order 49 would be completed. Referring to FIG. 10 there is illustrated a representation of an image of the items 45 selection generated by the invention. FIG. 11 contains a selected portion of items. Items chosen by the invention may be numerous.

Figure 3:
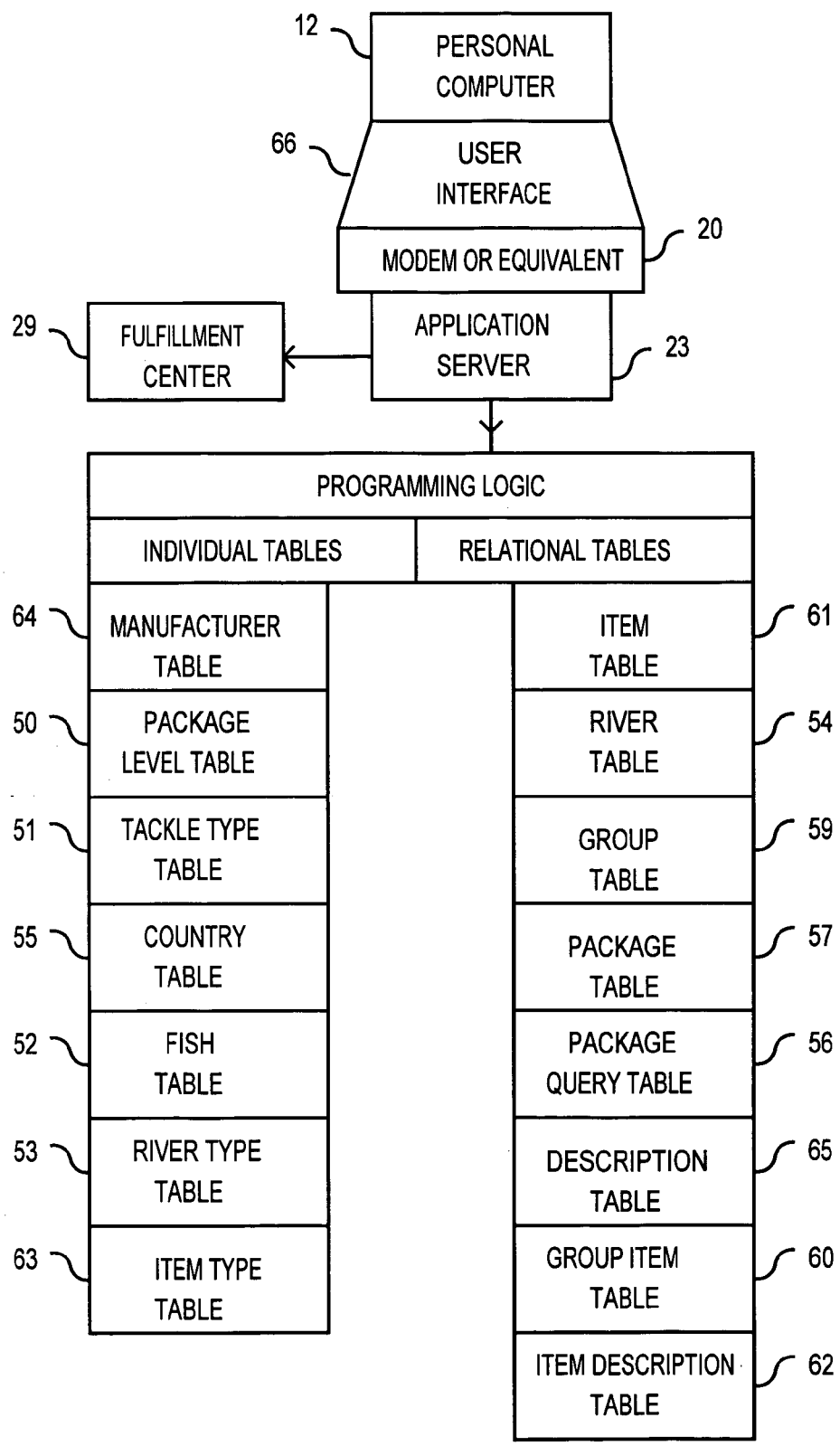
FIG. 3 is an enlarged view of the software block, as shown in FIG. 1 illustrating the specific embodiment of a data structure of the databases according to the present invention.

Referring to FIG. 3, there is illustrated the data structure of the database. The database sub-categories consist of the individual tables of package level 50, tackle type 51, fish type 52, water or river type 53 item type 63, manufacturer 64, and country 55, and relational tables of group 59, group item 60, item 61, item description 62, river 54, package 57, package query 56, and description 65.

The database sub-categories are all accessed through the application server 23, utilizing programming logic which is accessed through the user interface 66. The user interface 66 resides in the personal computer system 12 which then communicates orders via a modem or equivalent 20 which are then filled via a remote fulfillment center 29.

Specific embodiments of the system and method for choosing multi-component packages according to the invention have been described for the purpose of illustrating the manner in which the invention can be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations or equivalents that fall within the true spirit and scope of the basic underlying principles disclosed and claimed herein.

What is claimed is:

1. A method for developing multi-component item packages utilizing a selection website, comprising:
    storing query data in a query database;
    accessing query data to create an initial query;
    presenting a user with the initial query;
    receiving user response to the initial query;
    using the user response directed to desired use of said packages and subsequent user responses to generate subsequent queries by reaccessing the query database;
    storing selection data in a selection database;
    utilizing the selection database to generate proposed multi-component item packages based on the query responses; and
    presenting multi-component item packages for selection by the user.

2. The method of claim 1, further comprising querying based on quality requirements.

3. The method of claim 1, further comprising querying based on use location.

4. The method of claim 1, further comprising querying based on personal preference type.

5. The method of claim 1, further comprising allowing the user to delete items from the multi-component item package prior to purchase.

6. The method of claim 1, further comprising allowing the user to add items from the multi-component item package prior to purchase.

7. The method of claim 1, further comprising accessing the selection website from another website using interchangeable framing.

8. A system for developing multi-component item packages utilizing a selection website, comprising:
    means for storing query data in a query database;
    means for accessing query data to create an initial query;
    means for presenting a user with initial query;
    means for receiving the user response to the initial query that is directed to desired use of said packages;
    means for using the user response and subsequent user responses to generate subsequent queries by reaccessing the query database;
    means for storing selection data in a selection database;
    means for utilizing the selection database to generate proposed multi-component item packages based on the query responses; and
    means for presenting multi-component item packages for selection by the user.

9. The system of claim 8, wherein the query is based on quality requirements.

10. The system of claim 8, wherein the query is based on use location.

11. The system of claim 8, wherein the query is based on personal preference type.

12. The system of claim 8, wherein the user can delete items from the multi-component item package prior to purchase.

13. The system of claim 8, wherein the user can delete items from the multi-component item package prior to purchase.

14. The system of claim 8, wherein the selection website can be accessed from another website using interchangeable framing.

* * * * *